US005930126A

United States Patent [19]

Griffin et al.

[11] Patent Number: 5,930,126

[45] Date of Patent: Jul. 27, 1999

[54] BALLAST SHUT-DOWN CIRCUIT RESPONSIVE TO AN UNBALANCED LOAD CONDITION IN A SINGLE LAMP BALLAST OR IN EITHER LAMP OF A TWO-LAMP BALLAST

[75] Inventors: Raymond T. Griffin, Plano; Davood B. Motlagh, Arlington, both of Tex.

[73] Assignee: The Genlyte Group Incorporated, Secaucus, N.J.

[21] Appl. No.: 08/871,564

[22] Filed: Jun. 2, 1997

Related U.S. Application Data

[63] Continuation of application No. 08/621,955, Mar. 26, 1996, Pat. No. 5,636,111.

[51] Int. Cl.[6] .............................. H02M 5/45; H05B 37/02

[52] U.S. Cl. .............................................. 363/37; 315/225

[58] Field of Search .................................. 363/34, 37, 53, 363/56; 315/201, 203, 205, 209 R, 211, 225

[56] References Cited

U.S. PATENT DOCUMENTS

| | | | |
|---|---|---|---|
| 4,382,212 | 5/1983 | Bay | 315/225 |
| 4,501,992 | 2/1985 | Evans et al. | 315/122 |
| 4,503,363 | 3/1985 | Nilssen | 315/225 |
| 4,700,113 | 10/1987 | Stupp et al. | 315/224 |
| 5,111,114 | 5/1992 | Wang | 315/225 |
| 5,138,235 | 8/1992 | Sun et al. | 315/209 R |
| 5,262,699 | 11/1993 | Sun et al. | 315/209 R |
| 5,371,439 | 12/1994 | Griffin | 315/209 R |
| 5,451,845 | 9/1995 | Ribarich | 315/225 |
| 5,475,284 | 12/1995 | Lester et al. | 315/209 R |

*Primary Examiner*—Matthew Nguyen
*Attorney, Agent, or Firm*—Dennis T. Griggs

[57] ABSTRACT

An abnormal or unbalanced load operating condition is detected in a single lamp ballast circuit or in either lamp of a two-lamp ballast circuit by feedback voltage signals that are proportional to the flow of current through the cathodes of each lamp. The analog feedback signals are combined algebraically by a summing circuit that produces a null (zero) value corresponding with normal lamp operation, and produces a non-zero value in response to abnormal cathode current flow. The non-zero value is compared with the reference value to generate a shut-down signal. In one embodiment, the cathode currents are sensed by primary windings of a toroid transformer, and the feedback signals are the magnetic flux components that are generated in response to cathode current flow through the current sensing windings. In another protective circuit embodiment, feedback signals derived from the positive and negative portions of an asymmetrical waveform appearing across the power input pins of a lamp are compared and summed together to produce an output voltage that triggers a shut-down signal if the energy content of the positive portion or of the negative portion of the asymmetrical waveform is greater than a predetermined threshold value.

1 Claim, 6 Drawing Sheets

BALLAST SHUT-DOWN CIRCUIT RESPONSIVE TO AN UNBALANCED LOAD CONDITION IN A SINGLE LAMP BALLAST OR IN EITHER LAMP OF A TWO-LAMP BALLAST

CROSS REFERENCE TO RELATED APPLICATION

This is a continuation of application Ser. No. 08/621,955 filed Mar. 26, 1996, now U.S. Pat. No. 5,636,111.

FIELD OF THE INVENTION

This invention relates generally to ballast power supplies for energizing gas discharge lamps, and in particular to high-frequency electronic ballasts having protective shut-down circuitry for preventing lamp overheat damage caused by an open cathode, a short-circuit cathode or a depleted cathode at end-of-life.

BACKGROUND OF THE INVENTION

Low-pressure gas discharge lamps, such as compact fluorescent lamps, have a pair of tungsten cathodes which are coated with a metal oxide that emits electrons when heated. The electrons ionize pressurized gas within the lamp envelope, and when a high voltage is applied across the cathodes, electrical current is discharged between the cathodes in the form of a plasma arc that emits ultraviolet radiation. The interior of the lamp envelope is coated with a material that responds to the ultraviolet radiation by emitting visible light. The plasma arc within the lamp has a negative resistance characteristic that requires a series ballast impedance to maintain stable current flow.

The electron-emissive material gradually depletes through normal use of the lamp; consequently, the cathode current required to sustain the plasma arc increases substantially over a period of time. At the end of the useful life of the lamp, the power consumed by the depleted cathode may increase by a factor of ten or more, thus causing excessive heating of the cathode. Cathode overheating can cause the cathode to break and come into contact with the glass envelope, thus causing a local hot spot at extremely high temperatures approaching 2,000° C. Such localized overheating can be intense enough to cause the surrounding glass envelope to crack and melt the plastic body of the base. This condition can also occur at any point in the life of the lamp if the cathode should break, come into contact with the glass wall of the lamp and the ballast continues to supply enough energy to maintain the arc.

Localized over-heating can occur in low wattage, compact fluorescent lamps, for example fluorescent lamp types T2 and T4 corresponding with lamp envelope diameters of ¼" and ½", respectively. The cathodes of such lamps are located close to the glass envelope as compared with larger diameter lamps, for example type T8 (one inch diameter). Because of the limited radical spacing between the cathode and the glass wall, the small diameter fluorescent lamp can be subjected to excessive local overheating and extremely high temperatures in response to excessive current flow through a short-circuit cathode or a depleted cathode that has broken and comes into contact with the glass wall of the lamp.

Moreover, the gas discharge lamp operates on alternating current with the current flowing through the lamp in both directions, between the two electrodes that act alternately as a cathode and as an anode, and vice versa. Under end-of-life operating conditions, one of the two electrodes will become depleted of the alkaline metal oxide coating, thus losing its ability to emit electrons relative to the other electrode. This will cause the lamp to conduct electric current more readily in one direction than the other, thus generating a substantial direct current (DC) component that can damage the ballast circuit. Also, the direct current component can saturate the magnetic core of an inductive ballast, thus causing it to lose control of the AC voltage and current applied to the lamp.

DESCRIPTION OF THE PRIOR ART

Circuits providing over-voltage and over-current protection for solid-state high frequency electronic ballasts generally include means for detecting an abnormal operating condition, such as excessive lamp voltage, and a shut-down circuit which disables the inverter. This allows the entire ballast circuit to be shut-down when a lamp cathode has failed or the lamp has been removed, to avoid unstable oscillation of the ballast circuit.

Some conventional protective circuits include a fusible element or reactive device for disconnecting or reducing power applied to a lamp in response to excessive cathode current flow, for example as shown in U.S. Pat. No. 5,138,235 and U.S. Pat. No. 4,501,992.

According to another protective circuit as shown in U.S. Pat. No. 5,262,699, the inverter is disabled in response to the detection of a relatively large increase in the inverter current flow resulting from operating a lamp having an internally shorted cathode or having a depleted cathode. Other protective circuits shown, for example as shown in U.S. Pat. No. 5,111,114 and U.S. Pat. No. 4,503,363, sense an over-voltage condition on the output of the inverter, corresponding with an open cathode condition, removal of the lamp or failure of the lamp to ignite. Yet another protective technique discussed in U.S. Pat. No. 5,475,284 relies on the detection of a significant increase in ballast input power when the inverter input voltage is boosted in response to a load demand feedback signal from the lamp.

Still another protective circuit disclosed in U.S. Pat. No. 5,475,284 measures the magnitude of the DC voltage component of the lamp voltage when the lamp is operating at end-of-life with a depleted cathode, and disables the inverter in response to a predetermined increase in the DC component of the lamp voltage.

A limitation on the use of conventional ballast protection circuits is that a substantial change in some operating parameter must occur and continue for a predetermined period of time before the inverter shut-down circuit will operate. That is, such protective circuits are not responsive to slowly changing circuit conditions. Consequently, potentially damaging current and voltage conditions are ignored or suffered until the occurrence of a cathode failure event such as an open cathode, short-circuited cathode or a depleted cathode. During the time elapsed from the onset of excessive voltage or cathode current flow corresponding with an abnormal or unbalanced load condition leading to cathode failure, over-voltage can damage ballast components and possibly accelerate the failure event. Moreover, unless protective action is taken quickly, localized overheating caused by excessive cathode current flow can damage the lamp.

SUMMARY OF THE INVENTION

According to the present invention, a protective circuit is provided for quickly sensing an abnormal or unbalanced load operating condition in a single lamp ballast circuit or in either lamp of a two-lamp ballast circuit. In the single lamp embodiment, the cathodes are separately supplied with operating currents $I_{K1}$ and $I_{K2}$. Under normal, balanced lamp operating conditions, the total current into the lamp is equal to the total current out, $$I_L+I_{K1}=I_L+I_{K2}$$

and the current flow $I_{K1}$ through cathode K1 is equal to the current flow through the lamp cathode K2.

Analog feedback signals are generated that are proportional to the flow of current through each cathode. The analog feedback signals are combined algebraically within a summing circuit that provides a predetermined output, for example a null (zero) value, corresponding with normal lamp operation. The summing circuit output will be a non-zero value for an unbalanced cathode current condition. The non-zero value is compared with a reference value to generate a shut-down signal.

In the dual lamp embodiment, and assuming balanced load conditions, the lamps have substantially identical properties and are energized by equal driving voltages, so that the arc current $I_{L1}$ through lamp 1 of a commonly connected lamp pair lamp 1, lamp 2 is equal to the arc current $I_{L2}$ through lamp 2. Consequently, the total current flow into the lamps is equal to the total current flow out of the lamps during balanced load operation. For the commonly connected lamp pair, this implies that the sum of the current $I_{K1}$ flowing through the independently connected cathode K1 of lamp 1, plus the current $I_K$ flowing through the independently connected cathode $K_4$ of lamp 2 is equal to the sum of the currents flowing through the commonly connected cathodes K2, K3. This is expressed algebraically as follows:

$$I_{K1}+I_{K4}-(I_{K2}+I_{K3})=0$$

When the current flow through any cathode of either lamp increases above a predetermined acceptable level, for example corresponding with increased current flow through a depleted cathode operating at or near end-of-life conditions, or changes in response to an open cathode, a short-circuited cathode or lamp removal, the summing circuit produces a DETECT analog voltage signal that is compared to a reference voltage VREF in a shut-down comparator. If the magnitude of the DETECT analog voltage signal exceeds the reference value, the shut-down comparator transitions from a logic low value, corresponding with normal, balanced cathode current flow conditions, to a logic high value, corresponding with an abnormal cathode current flow condition. The logic high output of the shut-down comparator constitutes a trigger signal that is input to the SET input of a set-reset latch. The latch output Q changes state and sends a shut-down enable signal to a normally closed electronic switch. Opening of the electronic switch disables the inverter of the ballast circuit and thus removes all operating power from the lamp driver.

In the preferred embodiment, the analog signals are magnetic flux signals that are generated within the core of a toroid transformer. The current sensing elements are formed by primary windings that are connected in series with each independent lamp cathode, and in series with the power supply to the commonly connected lamp electrodes. The toroid transformer includes a secondary winding which produces a null or zero output voltage when the flux components are in balance, corresponding to normal lamp operation. The sense of the primary windings connected in the supply circuit of the independently connected lamp cathodes is established relative to the sense of the primary winding for the commonly connected cathodes so that the magnetic flux components are summed algebraically to be in balance when the cathode currents are equal.

The toroid transformer serves as a magnetic flux summing circuit, and its secondary winding produces an output voltage in response to a non-zero flux component in the toroid core. A non-zero flux component will develop immediately in response to differential current flow through any one of the lamp cathodes. The analog AC voltage signal produced by the secondary winding of the analog signal flux summing circuit is rectified and then input through a low pass filter to the non-inverting input of the shut-down comparator. The level of the reference voltage signal can be set arbitrarily close to the null voltage, so that the ballast can be safely shut-down immediately in response to the detection of an open cathode, a short-circuited cathode, lamp removal or a depleted cathode, and before the lamp is damaged by localized overheating.

BRIEF DESCRIPTION OF THE DRAWINGS

Referring now to the drawings in which like reference numerals and letters indicate corresponding elements throughout the several views.

DETAILED DESCRIPTION OF THE PREFERRED EMBODIMENTS

In the description which follows, the block and schematic diagrams illustrate major components of a related conventional functional group, wherein the present invention may be more readily understood.

Figure 1:
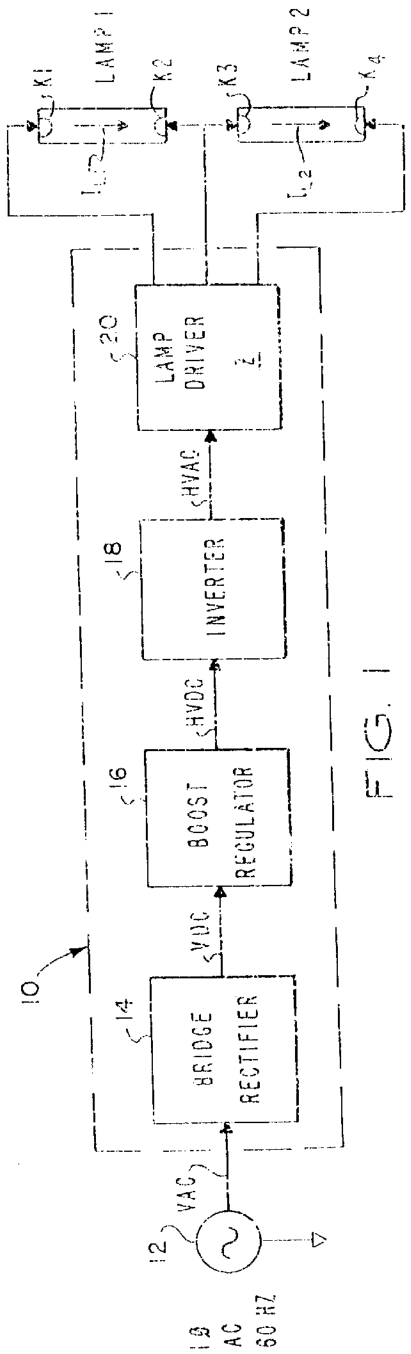
FIG. 1 is a general block diagram of a solid-state high frequency electronic ballast circuit coupled to two lamps.

Referring now to FIG. 1, a general block diagram of a solid-state, high frequency electronic ballast 10 provides operating power to a pair of four pin fluorescent lamps, lamp 1 and lamp 2. A single phase source 12 of AC line voltage VAC operating at 60 Hz is input to a full wave bridge rectifier 14, producing direct current voltage VDC. The rectified output voltage VDC is input to a boost regulator 16 which steps up the output voltage VDC to a desired high voltage level HVDC. The voltage output HVDC of the boost regulator 16 is coupled to an inverter 18 which chops the stepped-up DC voltage HVDC at a high frequency thereby producing a high voltage AC waveform HVAC. The output HAVC of the inverter 18 is preferably transformed by a reactance circuit Z in a lamp driver 20 to provide a high Q and a matching impedance for applying starting and operating current to lamp 1 and lamp 2.

Figure 2:
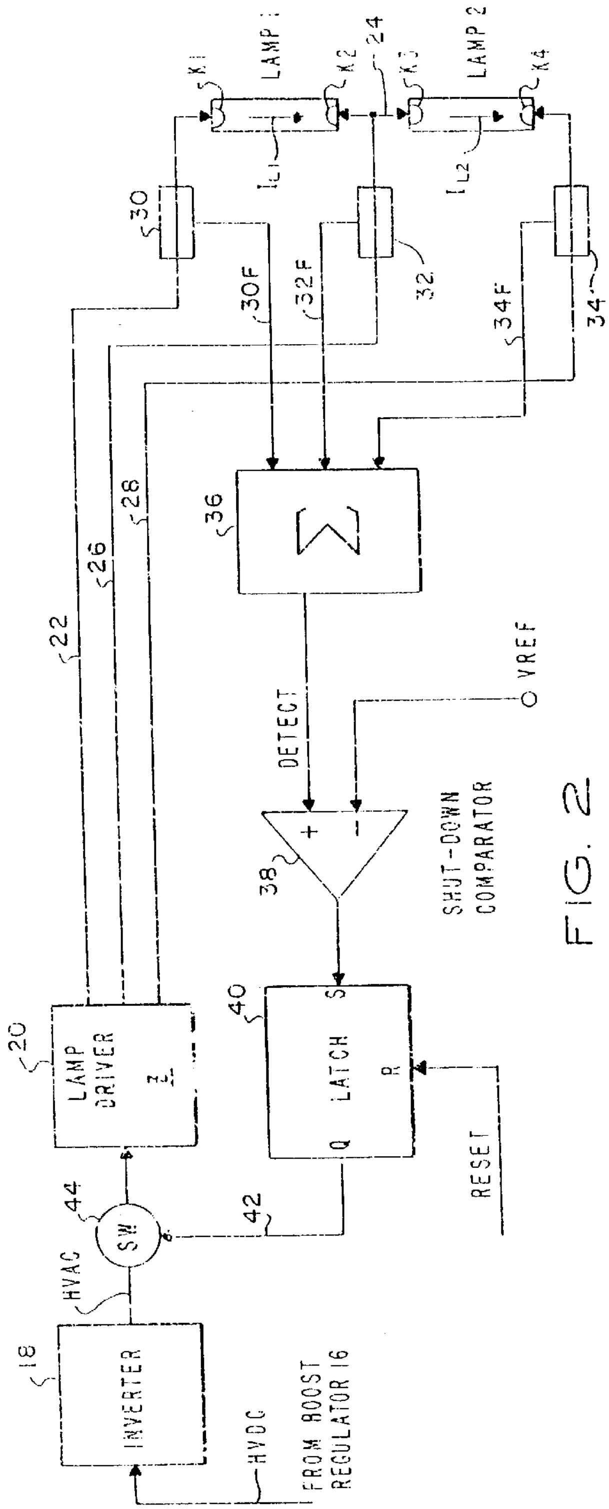
FIG. 2 is a simplified block diagram showing the interconnection of the protective circuit of the present invention with the ballast circuit of FIG. 1.

Referring now to FIG. 2, operating power for the independently connected cathode K1 of lamp 1 is supplied from the lamp driver 20 through a conductor 22, and the other cathode K2 of lamp 1 is connected in common with one of the cathodes K3 of lamp 2 through a conductor 24. operating power is supplied by the lamp driver 20 to the commonly connected cathodes K2, K3 through a conductor 26. The independently connected cathode K4 of lamp 2 receives its operating power from the lamp driver 20 through a conductor 28.

Referring again to FIG. 2, sensors 30, 32 and 34 are coupled to the power supply conductors 22, 26 and 28, respectively, for generating analog feedback signals 30F, 32F and 34F, respectively. Each analog feedback signal is proportional to the current flowing through the cathode that is being supplied by the power conductor to which it is coupled. According to the present invention, when the lamps are operating normally, the lamp arc currents $I_{L1}$ and $I_{L2}$ are equal. Consequently, the total current flow flowing through the commonly connected cathodes K2, K3 will equal the sum of the currents flowing through the independently connected cathodes K1, K4, and the algebraic sum of these currents may be expressed as follows:

$$I_{K1}+I_{K4}-(I_{K2}+I_{K3})=0$$

The analog signals 30F, 32F, 34F that correspond to the cathode currents are combined algebraically within a summing circuit 36. The output of the summing circuit 34 is designated DETECT, which has a null value (zero) when the cathode currents are in balance according to the equation given above. However, if the current flow through any one of the cathodes should change, the equation given above will no longer sum to zero, and instead will sum to a non-zero offset value N, so that the following equation is satisfied:

$$I_{K1}+I_{K4}-(I_{K2}+I_{K3})=N$$

The DETECT signal is input to the inverting input of a shut-down comparator 38. When the magnitude N of the DETECT signal rises above a predetermined reference voltage level VREF, the output of the shut-down comparator 38 transitions from a logic low value, corresponding with normal, balanced cathode current flow conditions (N=O), to a logic high value, corresponding with an abnormal cathode current flow condition in one or more of the cathodes. The logic high output of the shut-down comparator 38 is input to a latch 40 which sends a shut-down signal 42 to a normally closed electronic switch 44. When actuated, the electronic switch 44 disables the inverter 18 and thus removes operating power from the lamp driver 20.

Figure 3:
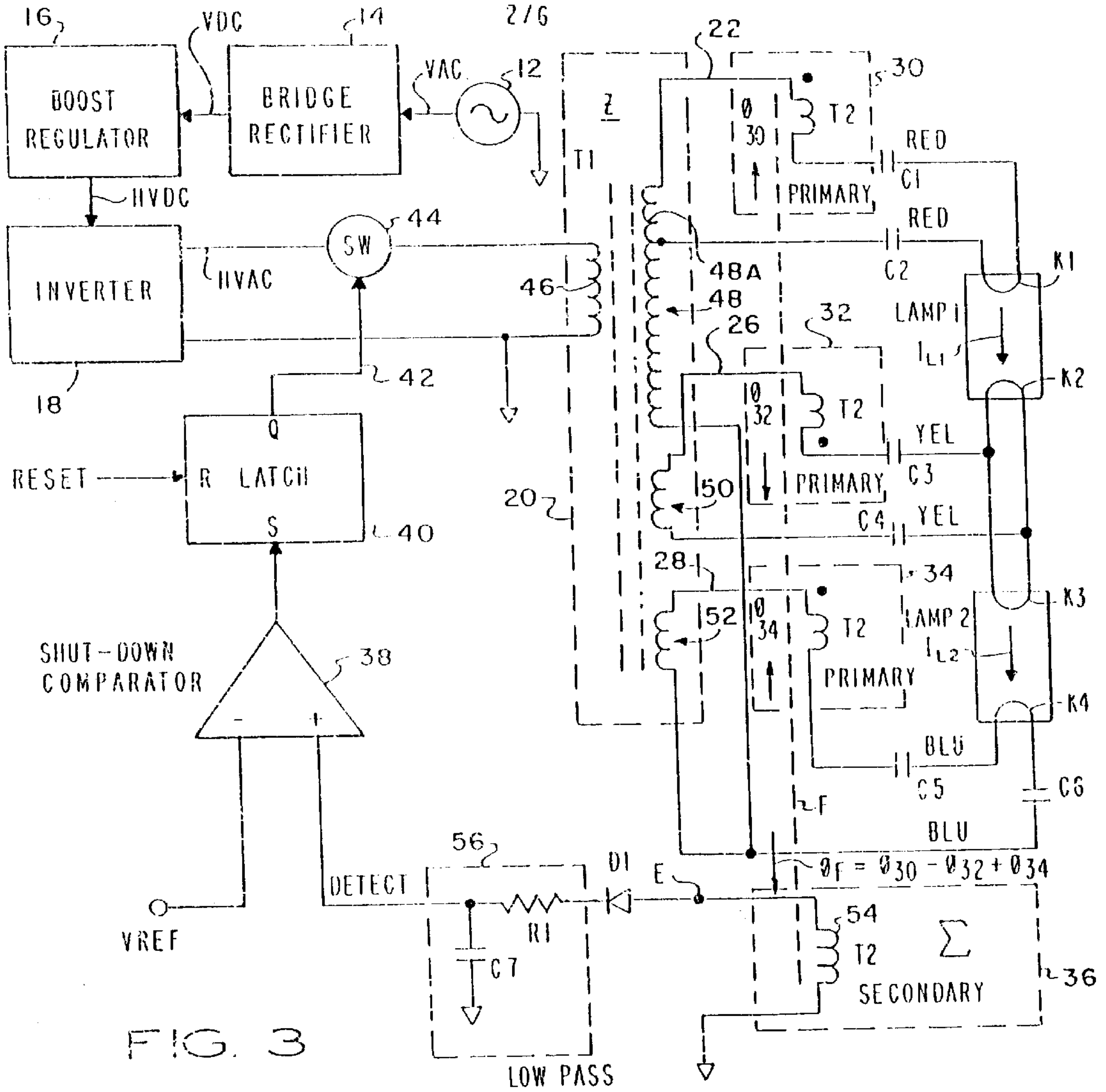
FIG. 3 is a schematic diagram of the preferred embodiment of the protective circuit in which the analog sensing elements and summing circuit are embodied in a toroid transformer having multiple primary windings and a secondary winding.
Figure 4:
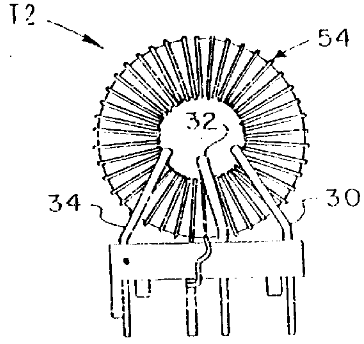
FIG. 4 is an elevation view of the toroid transformer shown in FIG. 3.
Figure 5:
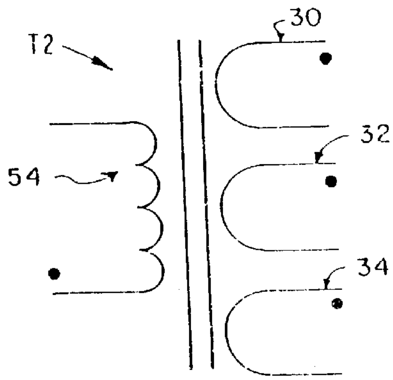
FIG. 5 is a schematic wiring diagram of the toroid transformer shown in FIG. 4.

Referring now to FIG. 3, FIG. 4 and FIG. 5, in the preferred embodiment the lamp driver 20 is a ferrite core transformer T1 having a primary winding 46 that is energized by the inverter 18. The transformer T1 has three secondary windings 48, 50 and 52 which supply operating voltage through DC isolation capacitors C1, C2, C3, C4, C5 and C6 to the lamp cathodes. The secondary winding 48 has a tapped winding section 48A that provides operating power for the independently connected cathode K1 of lamp 1 through conductor 22. The secondary winding 50 provides operating power to the commonly connected lamp cathodes K2, K3 through the primary conductor 26. Likewise, operating power is supplied to the independently connected lamp cathode K4 from the secondary winding 52 through the power conductor 28.

In this embodiment, the analog current sensors 30, 32 and 34 comprise the three primary windings 30, 32 and 34 wound on a ferrite core F of a toroid transformer T2. The primary windings 30, 32 and 34 are connected in series electrical relation with the power conductors 22, 26 and 28, respectively. Current flow through the sensor windings generates magnetic flux signals $\Phi_{30}$, $\Phi_{32}$ and $\Phi_{34}$ in the ferrite core F. The toroid transformer T2 also includes a secondary winding 54 which produces a null or zero output voltage when the flux components $\Phi_{30}$, $\Phi_{32}$ and $\Phi_{34}$ are in balance.

The current sense of the primary sensing windings 30, 34 connected in the supply circuits of the independently connected lamp cathodes K1, K4 is established relative to the current sense of the primary sensing winding 32 for the commonly connected cathodes K2, K3 so that the magnetic flux components $\Phi_{30}$, $\Phi_{32}$, $\Phi_{34}$ sum to zero within the toroid core F when the cathode currents are equal.

The toroid transformer T2 performs as a magnetic flux summing circuit 36, and its secondary winding 54 produces an output voltage E in response to a non-zero total flux component in the toroid core. A non-zero total flux component $\Phi_F$ will develop immediately in response to unbalanced current flow through any one of the lamp cathodes K1, K2, K3 or K4. The analog voltage signal E produced by the secondary winding 54 of the analog signal flux summing circuit 36 is rectified by a diode D1 and is input to a low pass filter 56. The DC output of the low pass filter 56 is then input as the signal DETECT to the shut-down comparator 38.

Figures 6, 7:
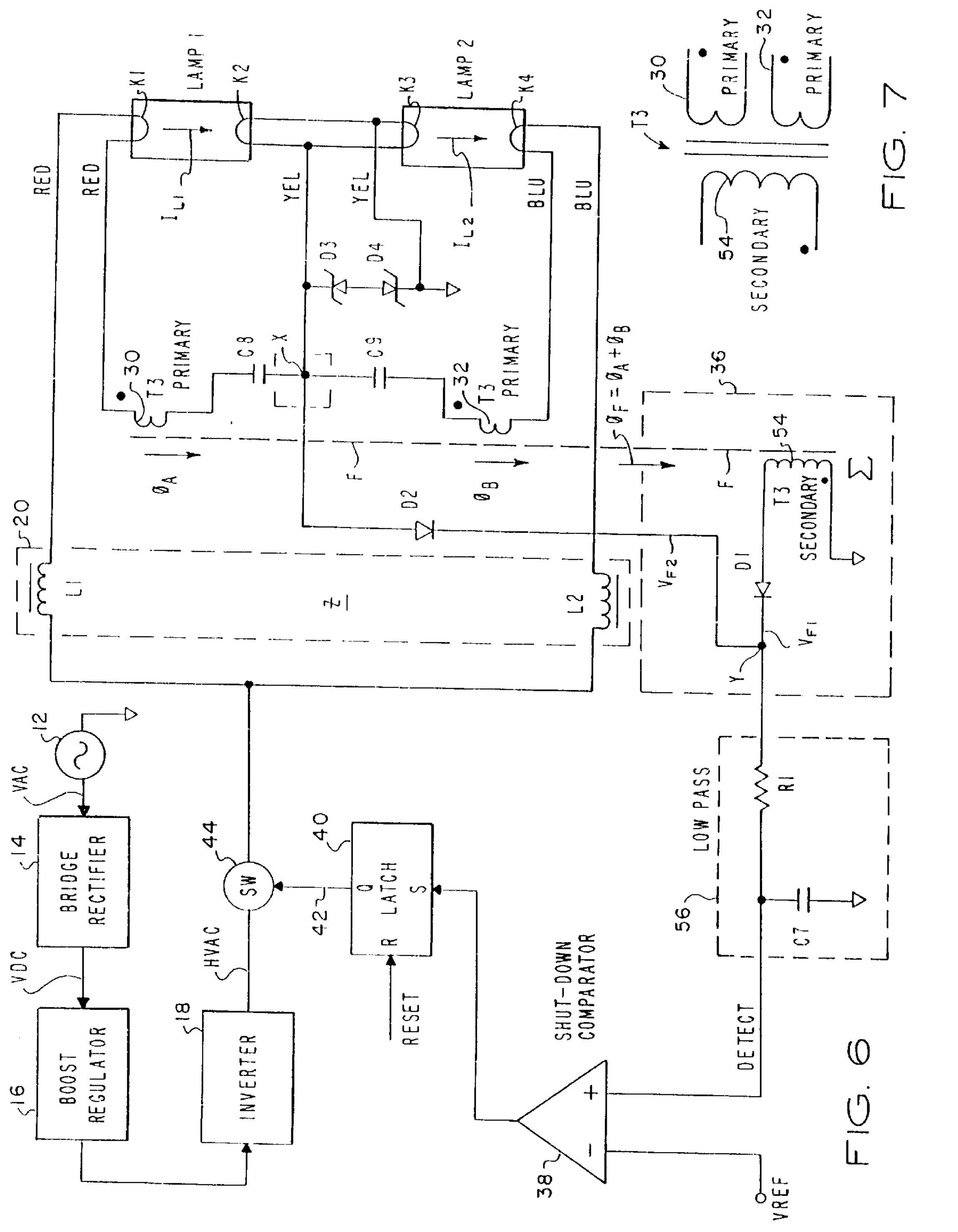
FIG. 6 is a simplified schematic diagram of a protective circuit using a toroid transformer having only two primary windings and one secondary winding.
FIG. 7 is a schematic circuit diagram of the toroid transformer shown in FIG. 6.

Referring now to FIG. 6 and FIG. 7, another protective circuit is shown in combination with two lamps, lamp 1 and lamp 2, having commonly connected cathodes K2 and K3 and independently connected cathodes K1 and K4. In this embodiment, the independently connected cathodes K1, K4 of lamp 1 and lamp 2 are separately energized through a resonant driver circuit 20 formed by inductor reactors L1 and L2 and series capacitors C8, C9, respectively. Return current flow is conducted through cathodes K2, K3 to ground reference. Node X provides a common connection for the series connected DC isolation capacitors C1, C2, the series connected Zener diodes D3, D4 and the series connected cathodes K2, K3. A feedback voltage signal is derived from the cathode voltage on node X as described below.

During normal, balanced operation, assuming all cathodes are intact, and that each lamp is in its socket, the cathode current sensing windings 30, 32 produce flux components $\Phi_A$ and $\Phi_B$ that are combined algebraically within the summing circuit 36. As a result of the change of flux through the secondary winding 54 of the toroid transformer T3, an AC voltage appears across the secondary winding 54. The AC waveform is rectified by diode D1, thus producing a first feedback voltage $V_{F1}$. At the same time, the AC voltage appearing at node X is conducted through diode D2 and appears as a second feedback voltage $V_{F2}$. The two feedback voltages appear at the output node Y. Because one of the diodes D1, D2 will be reverse biased, the feedback voltage having the greatest magnitude will be input to the low pass filter 56, where it appears as the DETECT voltage.

For balanced, normal operation of lamp 1 and lamp 2, the voltage on node X is zero, and the feedback voltage signal $V_{F2}$ is zero. At the same time, the feedback voltage $V_{F1}$ is a positive, non-zero value corresponding with the flux component $\Phi_F$ in the core of transformer T3. The comparator reference voltage VREF is adjusted to be slightly higher than $V_{F1}$ so that the output of the shut-down comparator 38 remains at the logic low condition during normal operation of the lamps.

However, if one of the independently connected cathodes K1, K4 should become open, the voltage at node X rises to a non-zero AC value, and the DC feedback voltage $V_{F2}$ rises to a positive value. At the same time, one of the flux components $\Phi_A$ or $\Phi_B$ will drop to zero, thus causing a one-half reduction in the voltage feedback signal $V_{F1}$. The higher voltage on node Y, $V_{F2}$, is input as the DETECT voltage signal, causing the shut-down comparator 38 to transition, thus triggering a shut-down signal.

If one of the commonly connected cathodes K2, K3 should open, the voltage on node X will be the clamped Zener voltage provided by the back-to-back connected zener diodes D3, D4. The clamped Zener voltage on node X is input as feedback voltage $V_{F2}$ at node Y. The Zener diodes D3, D4 are selected to provide a clamped Zener voltage $V_{F2}$ which is greater than the comparator reference voltage VREF, thus providing for ballast shut-down in the event of a failure of one of the commonly connected cathodes.

Figure 8:
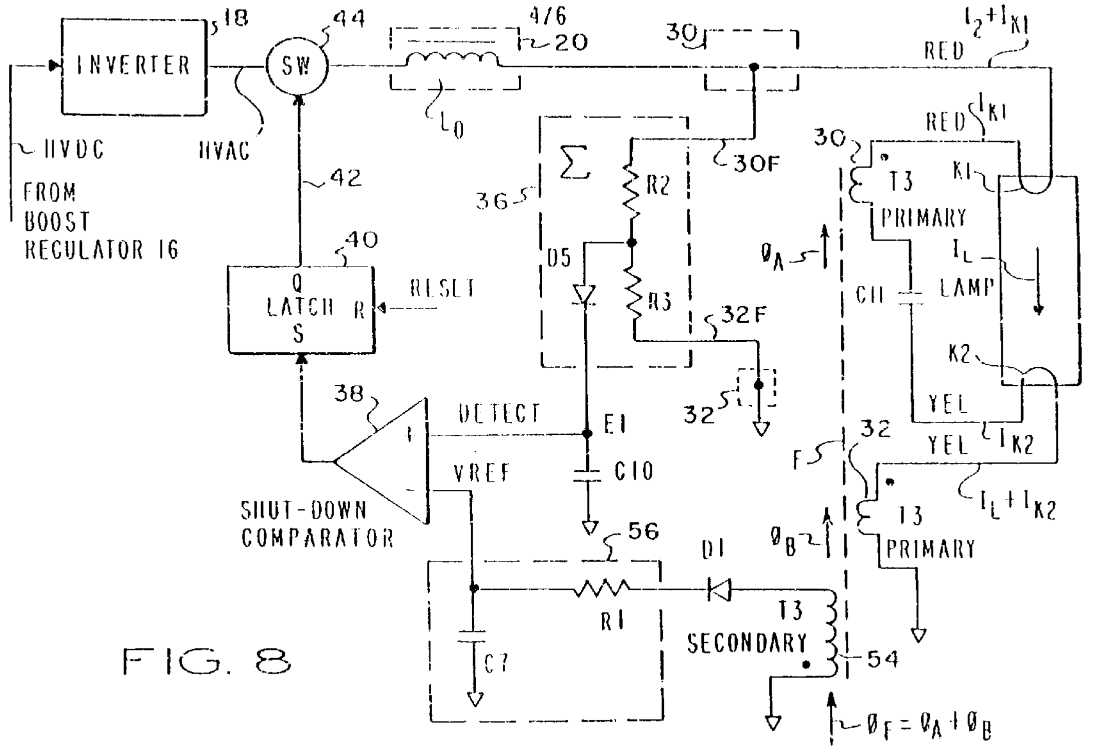
FIG. 8 is a simplified schematic diagram illustrating an alternative protective circuit embodiment for a single lamp ballast in which the lamp cathodes are connected in series.

The protective method and circuitry of the present invention is applicable to a single lamp ballast circuit as shown in FIG. 8. In that arrangement, the analog signal detection circuit provides an algebraic sum of the analog flux signals $\Phi_A$, $\Phi_B$ corresponding with current flow through the electrodes K1, K2, respectively. During normal operation, a non-zero flux component $\Phi_F=\Phi_A+\Phi_B$ input through the core F of a toroid transformer T3 having two primary current sensing windings 30, 32 and a secondary winding 54. The analog feedback flux component $\Phi_F$ produces an AC voltage that is rectified by the diode D1 and then is input through the low pass filter 56 to the non-inverting terminal of the shut-down comparator 38, thus providing a non-zero reference voltage VREF.

Referring again to FIG. 8, a feedback signal 30F is derived by a direct connection 30 from the HVAC voltage applied to cathode K1 of the single lamp. A feedback signal 32F is derived by a direct connection 32 from the ground reference. The feedback signals 30F, 32F are current signals that are fed through a voltage divider formed by resistors R2, R3. A diode D5 conducts positive half-cycle voltage from the voltage divider across a charging capacitor C10 at node E1. The DC voltage across capacitor C10 rises to a positive value which is input as the DETECT signal to the non-inverting input (+) of the comparator 38.

During normal lamp operation, with the single lamp having non-depleted cathodes K1, K2, the current flow into the lamp, $I_L+I_{K1}$, is equal to the current flow out of the lamp, $I_L+I_{K2}$. Consequently, under normal operating conditions, the cathode current $I_{K1}$ is equal to the cathode current $I_{K2}$, and a non-zero flux component $\Phi_F$ is produced in the core of the sensing toroid transformer T3. The flux component $\Phi_F$ generates a voltage across the secondary winding 54 of toroid transformer T3. The secondary voltage is rectified by the diode D1 and is input to the low pass filter 56 and appears as a positive DC voltage level VREF on the inverting (−) input of the shut-down comparator 38.

If either cathode K1, K2 should open, the flux component $\Phi_F$ will fall to zero, and the reference voltage VREF will fall to ground reference. The DETECT signal voltage E1, on the other hand, remains at a positive, non-zero voltage level across capacitor C10, thus causing the comparator 38 to transition to logic high. The logic high output of the comparator 38 is input to the SET terminal of the SR latch 40, which then conducts a shut-down signal 42 to the electronic switch 44, thus disconnecting the HVAC output of the inverter 18.

Another failure mode of the single lamp embodiment of FIG. 8 is a depleted cathode. If that should occur to either cathode, the lamp arc current $I_L$ would continue to flow, but the cathode currents $I_{K1}$ and $I_{K2}$ would be unbalanced and unequal. Increased current flow through either cathode causes an increase in the flux component $\Phi_F$. This, in turn, causes VREF to rise to a higher DC level. At the same time, the DETECT voltage E1 output from the summing circuit 36 increases proportionally, since the total current flow $I_T=I_{K1}+I_{K2}$ also increases. As a result, the DETECT voltage E1 is greater than VREF, and a shut-down signal is generated. Also, if either cathode opens, the VREF voltage falls to the ground reference potential (zero) and the DETECT will increase, since the total current flow is then conducted through the summing circuit 36.

Provided that R2=R3, the voltage at E1 will be zero during normal, balanced, cathode current flow conditions. If the lamp is removed from its socket, current flow through the cathodes K1, K2 is interrupted, and the reference voltage VREF falls to zero. The DETECT voltage E1 remains at a positive, non-zero value, thus causing the shut-down comparator to transition. The latch 40 is then set and conducts the shut-down signal 42 to the electronic switch 44.

Figure 9:
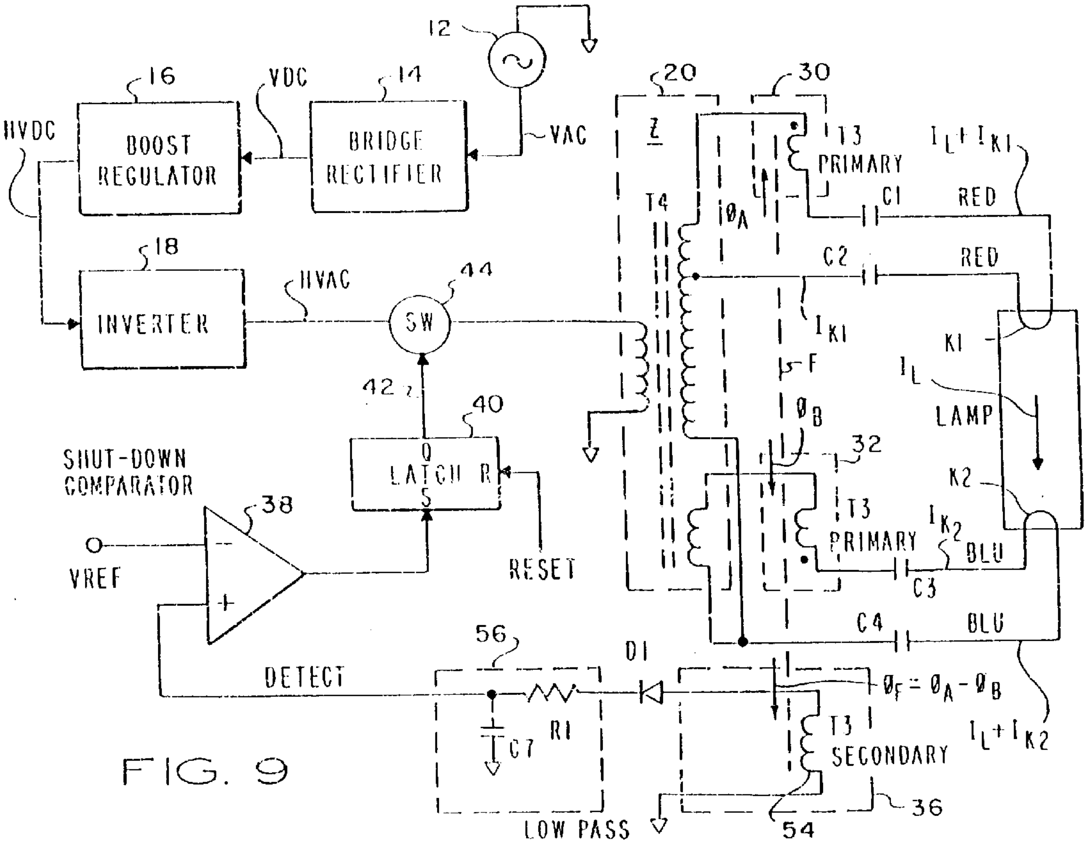
FIG. 9 is a simplified schematic diagram showing an alternative protective circuit embodiment for a single lamp ballast in which the cathodes are energized separately with respect to each other.

Referring now to FIG. 9, an alternative protective circuit embodiment is shown for a single lamp that is supplied from a transformer T4. In this embodiment, a magnetic flux feedback signal $\Phi_F$ having two components $\Phi_A$ and $\Phi_B$ are summed within the core of a toroid transformer T3. The primary windings 30, 32 are connected so that the flux components $\Phi_A$ and $\Phi_B$ are oppositely directed with respect to each other. The primary sensing winding 30 is connected in series with the main power conductor from the power supply transformer T4 which supplies lamp operating current and filament voltage to cathode K1. Likewise, the primary current sensing winding 32 is connected in series with the filament secondary winding of transformer T4 and cathode K2.

During normal operation of the lamp, when the cathodes K1 and K2 are in good condition and the lamp is in its socket, the flux components $\Phi_A$ and $\Phi_B$ are equal and produce a net zero flux component $\Phi_F$ within the secondary winding 54 of toroid transformer T3. Consequently, a zero DETECT voltage level is input to the inverting input of the shut-down comparator 38, whose output remains at a logic low condition. However, if one of the cathodes should open, become depleted or short-circuited, the flux feedback component $\Phi_F$ becomes a non-zero value, which causes the DETECT voltage level on the inverting input of the comparator 38 to rise above the REF, thus producing a shut-down signal as previously described.

Figure 10:
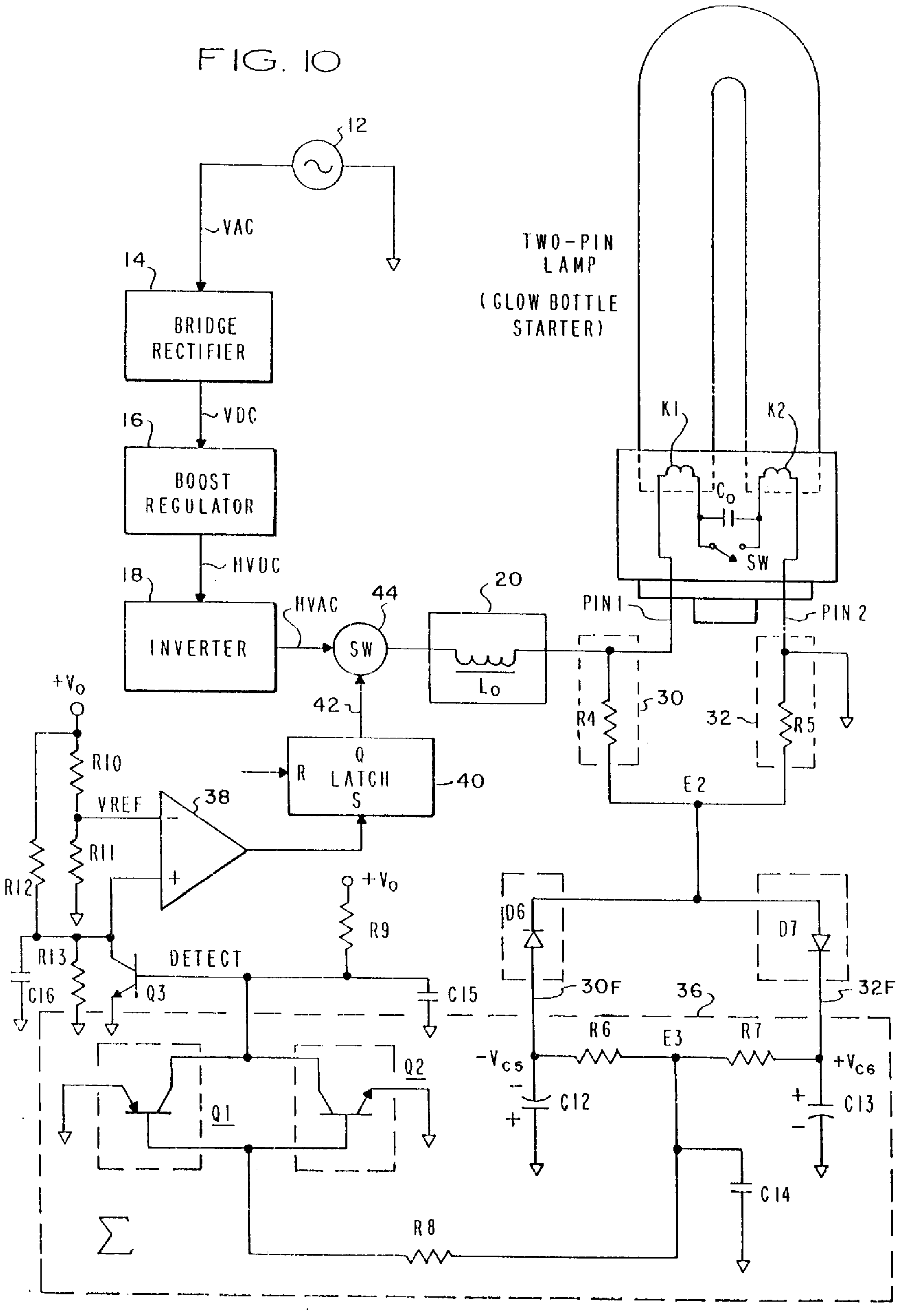
FIG. 10 is a simplified schematic circuit diagram showing an alternative protective circuit embodiment for a two-pin lamp having a glow bottle starter.

Yet another protective circuit arrangement for a single lamp ballast is shown in FIG. 10. In this embodiment, the lamp is a two-pin lamp having a glow bottle starter. The glow bottle starter circuit is formed by a capacitor $C_0$ connected in parallel with a thermal switch SW. The parallel connected capacitor and switch are connected in series with the cathodes K1, K2. When operating voltage is first applied across pin 1 and pin 2, the thermal switch SW is closed, thus permitting rapid heating of the cathodes K1, K2. After a short time interval, the thermal switch opens, and the cathodes are connected in series circuit relation by the capacitor $C_0$. The capacitor $C_0$ and the inductor $L_0$ in the lamp driver 20 are selected to provide a resonant circuit after the lamp arc $I_L$ is established.

The protective circuit shown in FIG. 10 is capable of detecting an open cathode condition in either cathode K1 or cathode K2. The cathode currents flowing through pin 1 and pin 2 are sensed on direct coupling nodes 30, 32. Voltage divider resistors R4, R5 provide a reduced amplitude AC voltage E2 from which feedback signals 30F, 32F are derived. Diodes D6, D7 are connected to the node E2 between R5 and R7 so that negative portions of the AC waveform at E2 are conducted as feedback signal 30F, and the positive portions of the AC waveform appearing at E2 are conducted as a feedback signal 32F.

According to the present invention, the analog feedback signals 30F, 32F are input to the summing circuit 36 and are applied to the input terminals of a voltage divider circuit formed by resistors R6, R7. The resistors R6, R7 have equal value, so that under balanced, normal lamp operating conditions, the voltage at node E3 is zero. Electrolytic capacitors C12, C13 are connected between ground reference potential and the input signals 30F, 32F, respectively. By this arrangement, the electrolytic capacitor C12 charges to a negative DC voltage level ($-V_{C12}$), and the capacitor C6 charges to a positive voltage level ($+V_{C13}$).

If either cathodes should fail, for example by depletion or by opening, the voltage waveform across pin 1 and pin 2 becomes asymmetrical. Under asymmetrical power waveform conditions, the energy content of the positive waveform portions and the negative waveform portions are not equal. The asymmetrical condition is detected according to the circuit shown in FIG. 10 by separately inputting the positive and negative waveform portions into the summing circuit 36. Because the positive and negative waveform portions are unequal, the charging capacitors C12, C13 will charge to different voltage levels, thus producing a non-zero voltage level on node E3. Consequently, the voltage appearing at node E3 will either be positive or negative, depending upon the asymmetry of the power voltage waveform applied across pin 1 and pin 2.

The node voltage E3 is filtered by capacitor C14 and is applied through a current limiting resistor R8 as an input to the base of a pair of switching transistors Q1, Q2. Q1 is a PNP transistor, and Q2 is an NPN transistor. Initially, both transistors Q1, Q2 are off, assuming normal lamp operation and a zero node voltage at E3. However, if the voltage on node E3 rises to a positive or negative value greater than the base-to-emitter voltage of either Q1 or Q2, one of the transistors will turn on, thus pulling the base of DETECT transistor Q3 to ground reference potential. DETECT transistor Q3 is normally on, as a result of a bias voltage developed by a resistor R9 that connects $+V_0$ bias voltage to the base of NPN transistor Q3. However, when either Q1 or Q2 conduct, the base of DETECT transistor Q3 is brought to ground reference potential, thus causing it to turn off.

The inverting and non-inverting inputs of the comparator 38 are initially biased by bias resistors R10, R11 and R12, R13 to maintain the comparator output in the logic low condition when the lamp is operating normally and the differential voltage at node E3 is a zero or some value less than a predetermined threshold limit. The capacitor C15 and a capacitor C16 filters transient voltages that could produce a false DETECT signal. Initially, the DETECT transistor Q3 is turned on, thus maintaining the non-inverting input of the comparator 38 at a value less than the reference voltage VREF. However, if either transistor switch Q1 or Q2 turns on, the DETECT transistor Q3 is turned off, thus permitting the voltage on the non-inverting input of the comparator 38 to rise to a value that exceeds the reference voltage VREF. As the comparator 38 transitions from logic low to logic high, the latch 40 is set, thus producing a trigger signal 42 that opens the electronic switch 44. This disconnects the HVAC operating power from the lamp.

Figure 11:
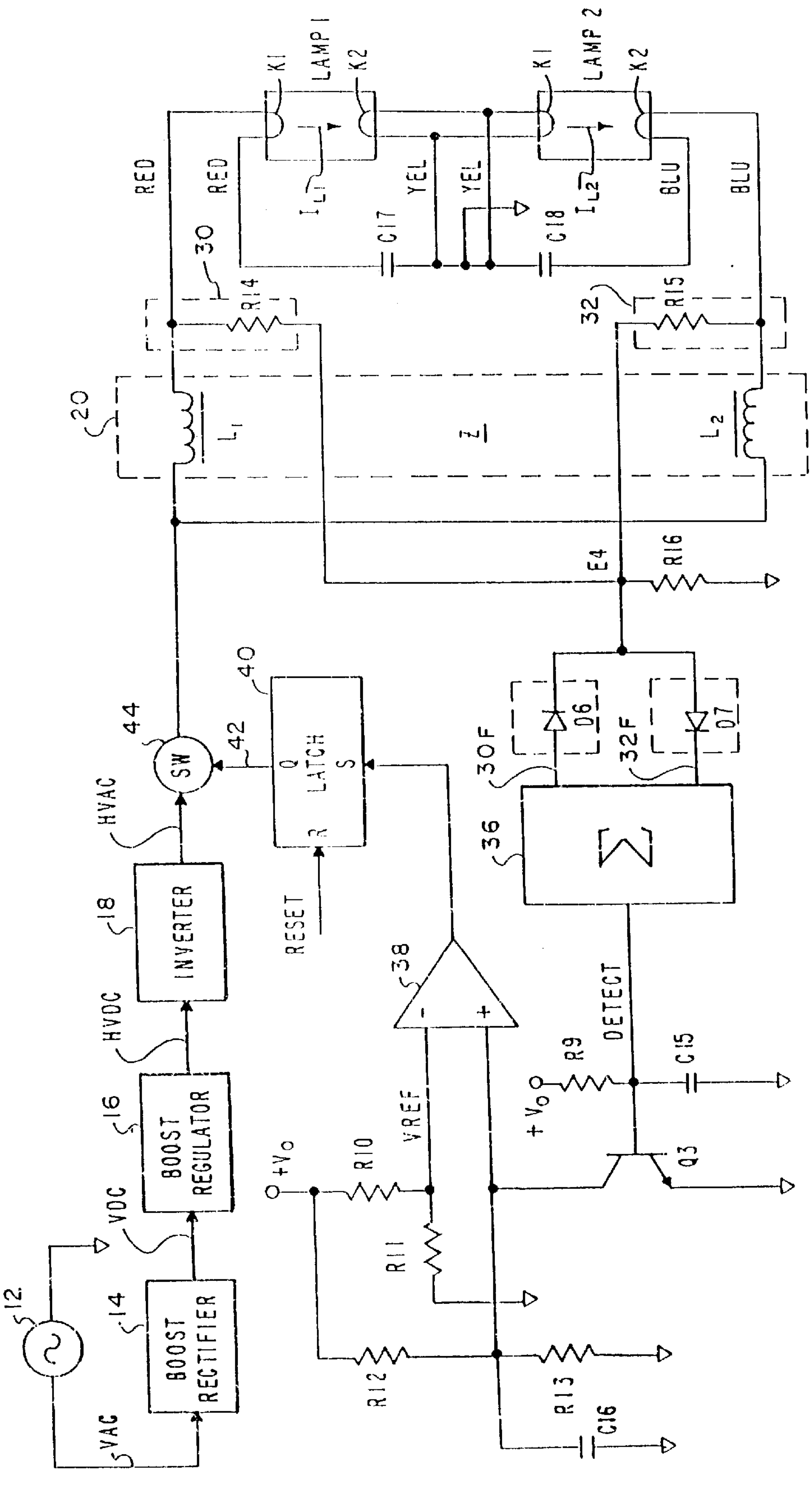
FIG. 11 is a simplified schematic circuit diagram showing an alternative protective circuit embodiment for driving two lamps.

Referring now to FIG. 11, a protective circuit that is responsive to an asymmetrical waveform condition is interconnected with a ballast circuit that supplies operating power to two lamps, lamp 1 and lamp 2, that have commonly connected cathodes K1, K2. The current flow into cathode K1 is sensed by a feedback resistor R14, and current flow through cathode K2 is sensed by a feedback resistor R15. The feedback resistors R14, R15 are connected to resistor R16 in a voltage divider arrangement, with the voltage E4 appearing at the voltage divider node E4 being input to the summing circuit 36. The positive half-cycle of the AC waveform on node E4 is conducted as feedback signal 32F through the diode D7. Likewise, the negative portion of the waveform appearing at node E4 is input to the summing circuit through the diode D6 as feedback signal 30F. The feedback voltages 30F, 32F are combined algebraically and are compared to produce a DETECT signal in the same manner as discussed in connection with the operation of the summing circuit 36 in FIG. 10. The operation of the protective circuit of FIG. 11 for producing the turn-off signal 42 is the same as discussed in connection with the two pin lamp of FIG. 10.

What is claimed is:

1. An electronic ballast comprising, in combination:

a power supply including supply conductors for supplying AC operating power at an operating voltage amplitude and frequency to the first and second cathodes of a gas discharge lamp;

a sensing circuit coupled to the supply conductors for generating feedback signals proportional to electrical current flowing through said power supply conductors, said sensing circuit comprising first and second primary windings connected in series with the first and second cathodes, respectively, for generating magnetic flux signals proportional to the flow of current through said cathodes, respectively;

a summing circuit coupled to the sensing circuit for generating an output voltage that is proportional to a predetermined combination of the magnetic flux signals, the summing circuit comprising a magnetic core, said first and second primary windings being wound about said core, and including a secondary winding wound about said core for generating an output voltage in response to the flow of magnetic flux in said core; and, a ballast shut-down circuit coupled to said secondary winding and the power supply for removing AC operating power from said cathodes in response to the condition that the magnitude of the secondary winding output voltage exceeds the magnitude of a reference signal.

* * * * *